(12) United States Patent

Hernandez Guerrero

(10) Patent No.: US 12,685,929 B2

(45) Date of Patent: Jul. 21, 2026

(54) THREE-DIMENSIONAL DISPLAY SYSTEM FOR VIDEO GAMES

(71) Applicant: Johnny Angel Hernandez Guerrero, Ontario, CA (US)

(72) Inventor: Johnny Angel Hernandez Guerrero, Ontario, CA (US)

(*) Notice: Subject to any disclaimer, the term of this patent is extended or adjusted under 35 U.S.C. 154(b) by 265 days.

(21) Appl. No.: 18/537,374

(22) Filed: Dec. 12, 2023

(65) Prior Publication Data

US 2025/0186880 A1 Jun. 12, 2025

(51) Int. Cl.
*A63F 13/25* (2014.01)
*G03H 1/00* (2006.01)

(52) U.S. Cl.
CPC ........... *A63F 13/25* (2014.09); *G03H 1/0005* (2013.01); *A63F 2300/8082* (2013.01); *G03H 2227/02* (2013.01)

(58) Field of Classification Search
CPC ............. A63F 13/25; A63F 2300/8082; G03H 1/0005; G03H 2227/02
See application file for complete search history.

(56) References Cited

U.S. PATENT DOCUMENTS

| | | | | |
|---|---|---|---|---|
| 6,514,145 | B1 * | 2/2003 | Kawabata | ............... A63F 13/90 |
| | | | | 463/20 |
| 7,108,262 | B2 * | 9/2006 | Giegerich | .......... A63B 69/0053 |
| | | | | 273/108 |
| 8,482,601 | B2 | 7/2013 | Thomas | |
| 10,762,812 | B1 | 9/2020 | Thornton | |
| D948,076 | S | 4/2022 | Goetgeluk | |
| 11,526,024 | B2 | 12/2022 | Kim | |
| 2011/0263339 | A1 * | 10/2011 | Cole | ....................... G07F 17/32 |
| | | | | 463/46 |
| 2014/0320596 | A1 | 10/2014 | Qualls | |
| 2017/0285448 | A1 | 10/2017 | Figgers | |
| 2018/0050273 | A1 * | 2/2018 | Garoufalis | .......... G07F 17/3286 |
| 2021/0362047 | A1 | 11/2021 | Farrell, Jr. | |
| 2022/0409995 | A1 | 12/2022 | Bevensee | |
| 2024/0033624 | A1 * | 2/2024 | Phillips | ................. A63F 13/355 |

FOREIGN PATENT DOCUMENTS

GB 2477508 10/2011

* cited by examiner

*Primary Examiner* — Peter J Iannuzzi

(57) ABSTRACT

A three-dimensional display system for displaying virtual holographic characters between a pair of players for a game includes a holographic display for displaying holographic images which are viewable from a peripheral space surrounding the holographic display. Game data is stored on a pair of remote electronic devices and may be used to display virtual game characters using the holographic display, including presenting the virtual game characters interacting with each other in response to player inputs. A method of projecting a video game with the virtual game characters is also disclosed.

10 Claims, 6 Drawing Sheets

THREE-DIMENSIONAL DISPLAY SYSTEM FOR VIDEO GAMES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to holographic displays and more particularly pertains to a new holographic display for displaying virtual holographic characters between a pair of players for a game.

(2) Description of Related Art Including Information Disclosed Under 37 CFR 1.97 and 1.98

The prior art relates to myriad holographic displays but fails to describe a three-dimensional display system which obtains game data from remote electronic devices and displays virtual game characters which correspond to the game data of the remote electronic devices. Such a system makes it possible for players of a video game to store unique game data on a remote electronic device, such as a smartphone or tablet, which can be used to display virtual game characters using the three-dimensional display.

BRIEF SUMMARY OF THE INVENTION

An embodiment of the disclosure meets the needs presented above by generally comprising a holographic display configured for displaying holographic images which are viewable from a peripheral space surrounding the holographic display and a processor operatively coupled to the holographic display. A pair of remote electronic devices is communicatively coupled to the processor, and each remote electronic device of the pair of electronic devices has a memory which stores player game data. The processor is operable to cause the holographic display to display virtual game characters corresponding to the player game data of each remote electronic device and to cause the holographic display to display the virtual game characters interacting with each other in response to input data.

Another embodiment of the disclosure comprises a method of projecting a video game. The method comprises positioning a pair of players opposite each other across a holographic display which is configured for displaying the holographic images to at least appear to occupy a space adjacent to one player of the pair of players when viewed by another player of the pair of players. A processor obtains game data from a pair of remote electronic devices and causes a holographic display to display virtual game characters corresponding to the player game data of each remote electronic device. The processor also causes the holographic display to display virtual game characters interacting with each other in response to input from the players.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 1:
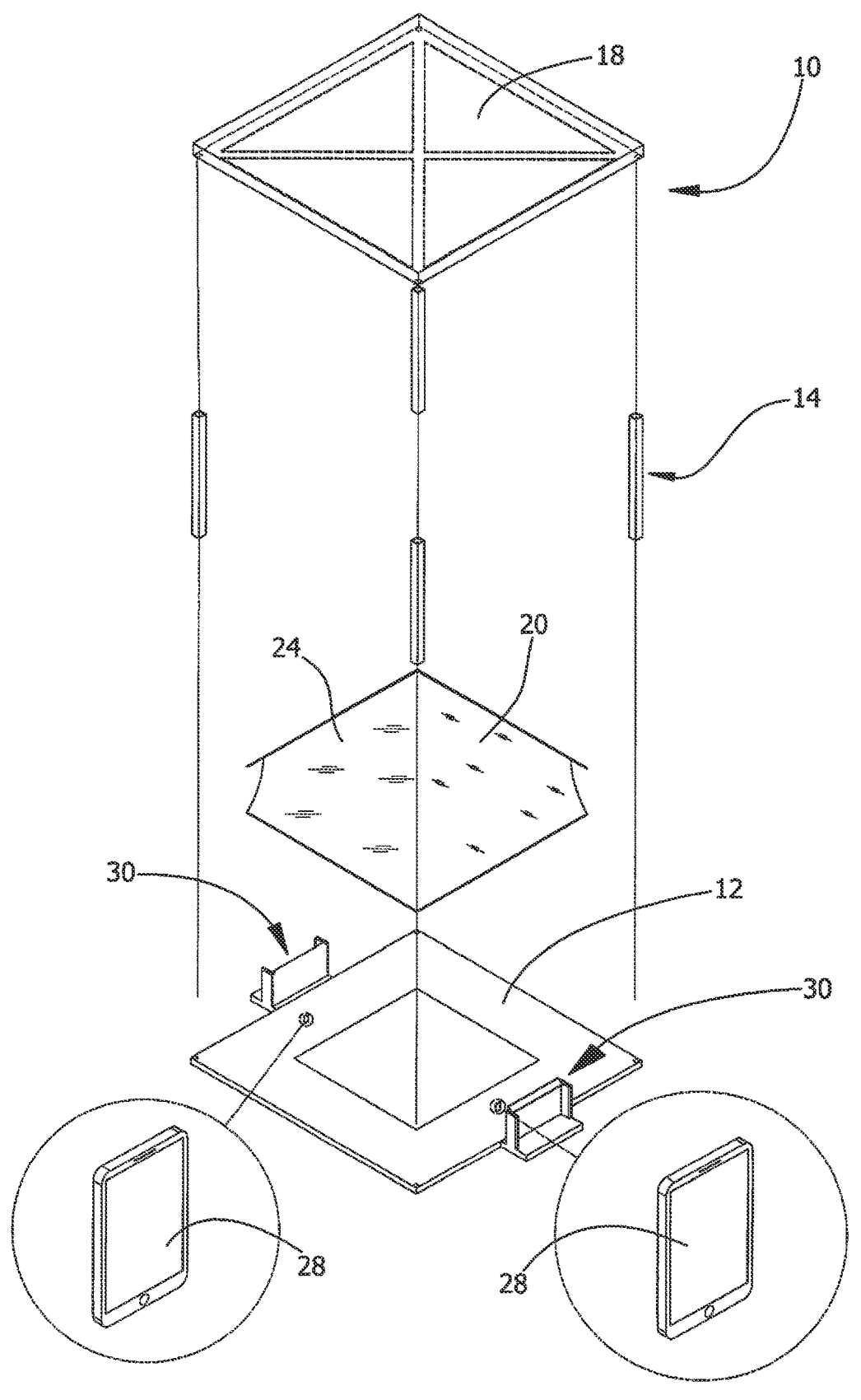
FIG. 1 is an exploded top perspective view of a three-dimensional display system according to an embodiment of the disclosure.
Figure 2:
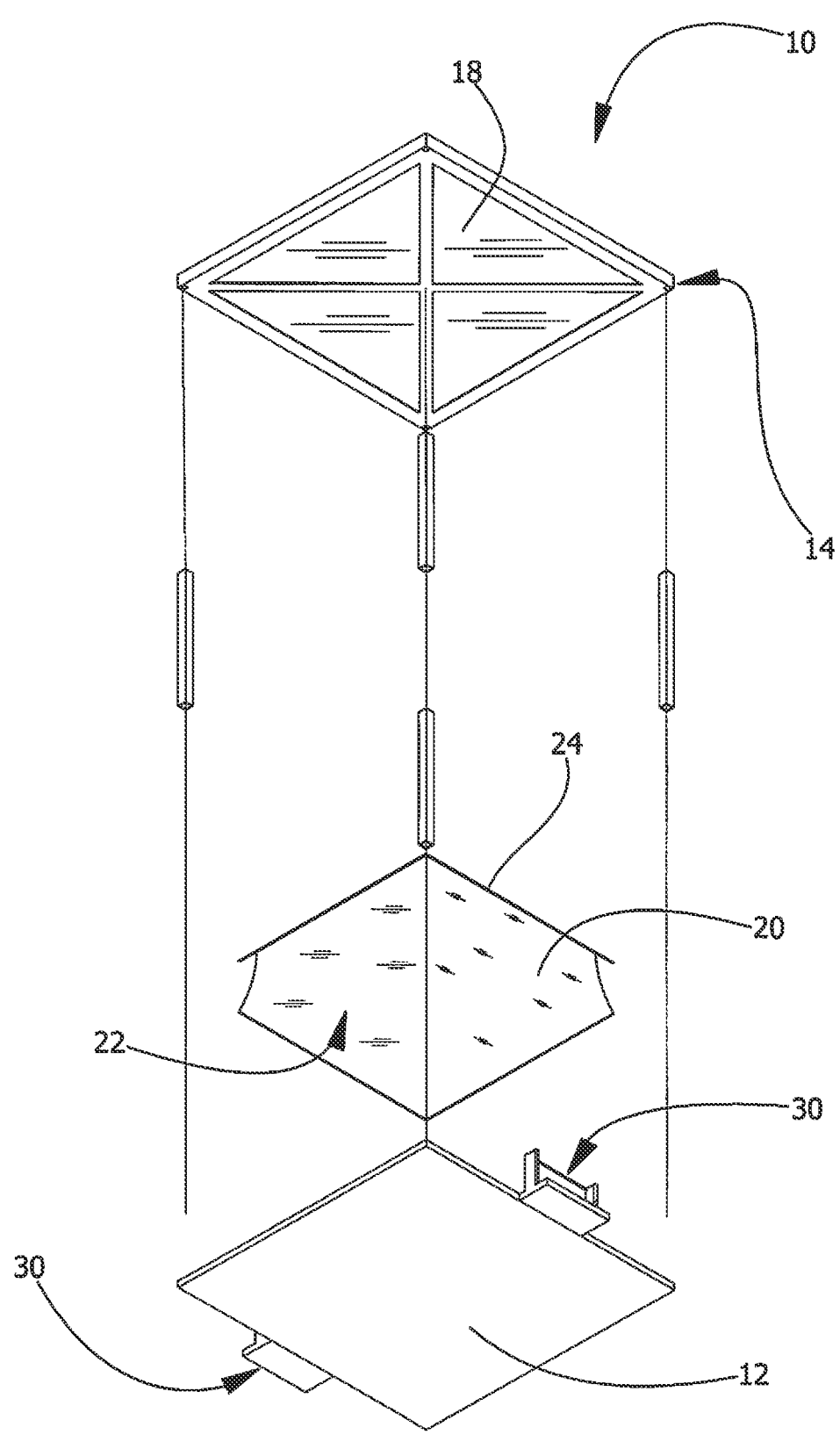
FIG. 2 is an exploded bottom perspective view of an embodiment of the disclosure.
Figure 3:
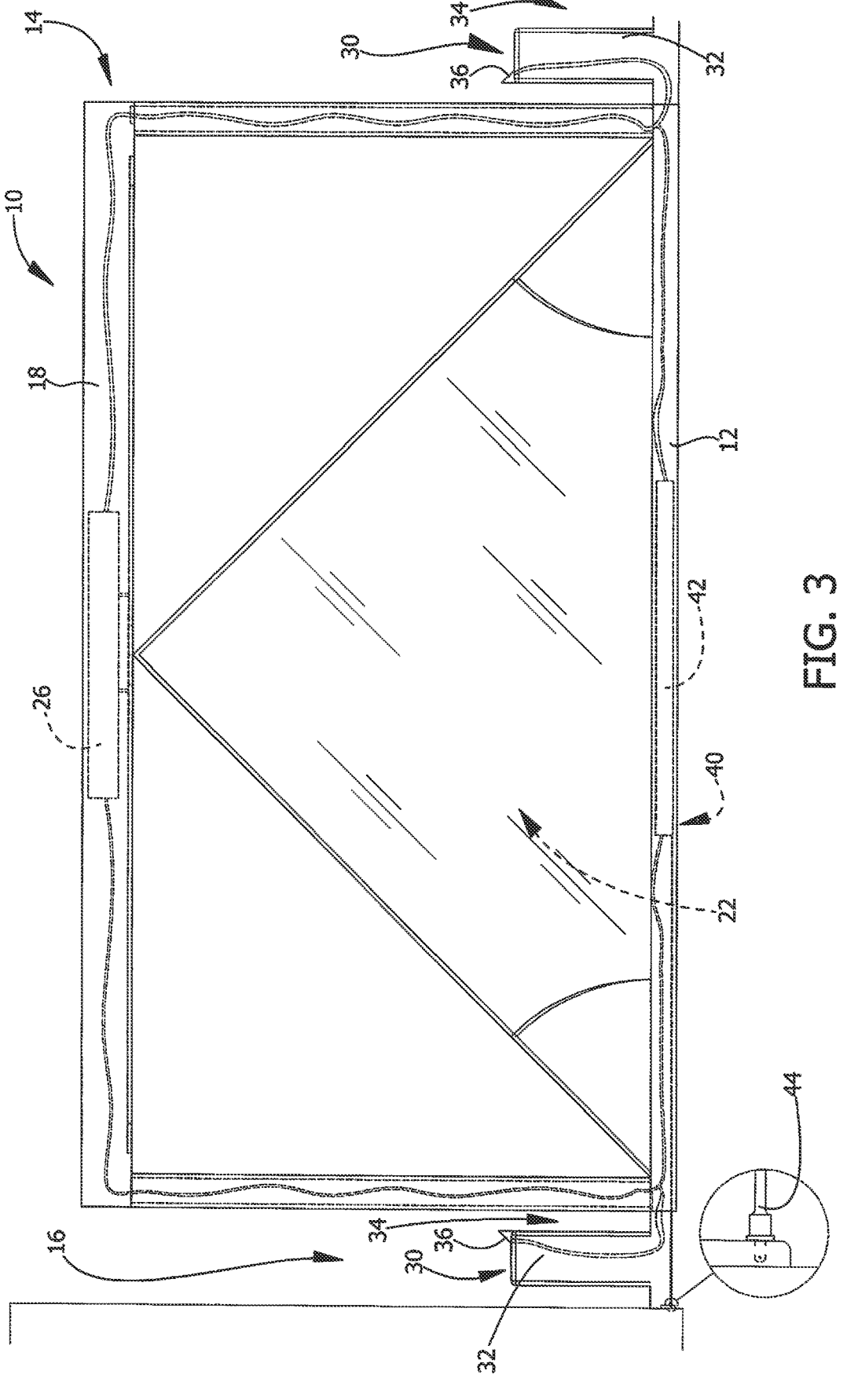
FIG. 3 is a front view of an embodiment of the disclosure.
Figure 4:
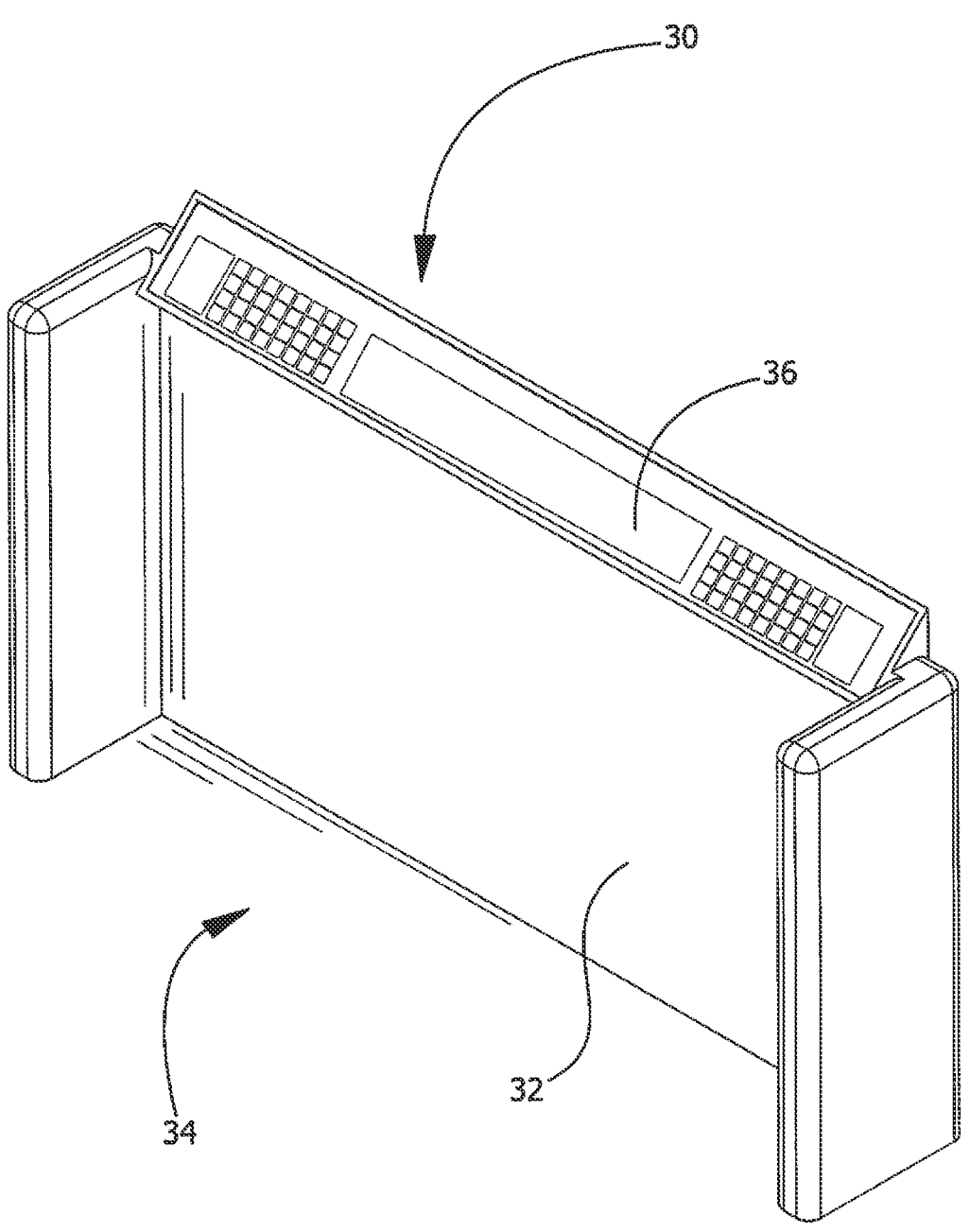
FIG. 4 is a detail view of a player station of an embodiment of the disclosure.
Figure 5:
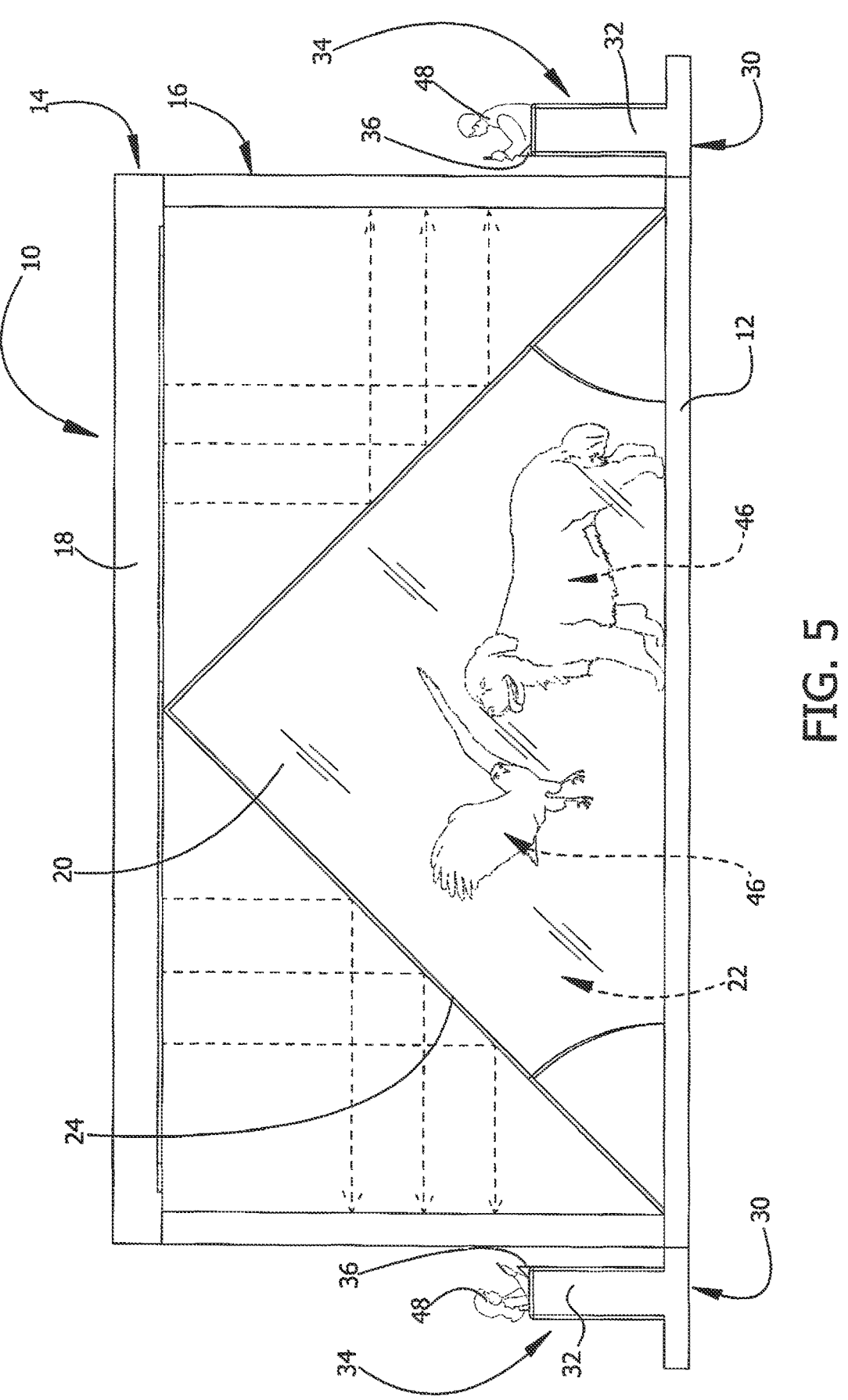

FIG. 5 is an in-use view of an embodiment of the disclosure. Virtual characters are depicted as being positioned in an interior volume defined by a display screen. In reality, the images of the characters would be reflected off of an exterior of the display screen, only appearing as though they are within the interior volume via an implementation of a Pepper's ghost illusion.

Figure 6:
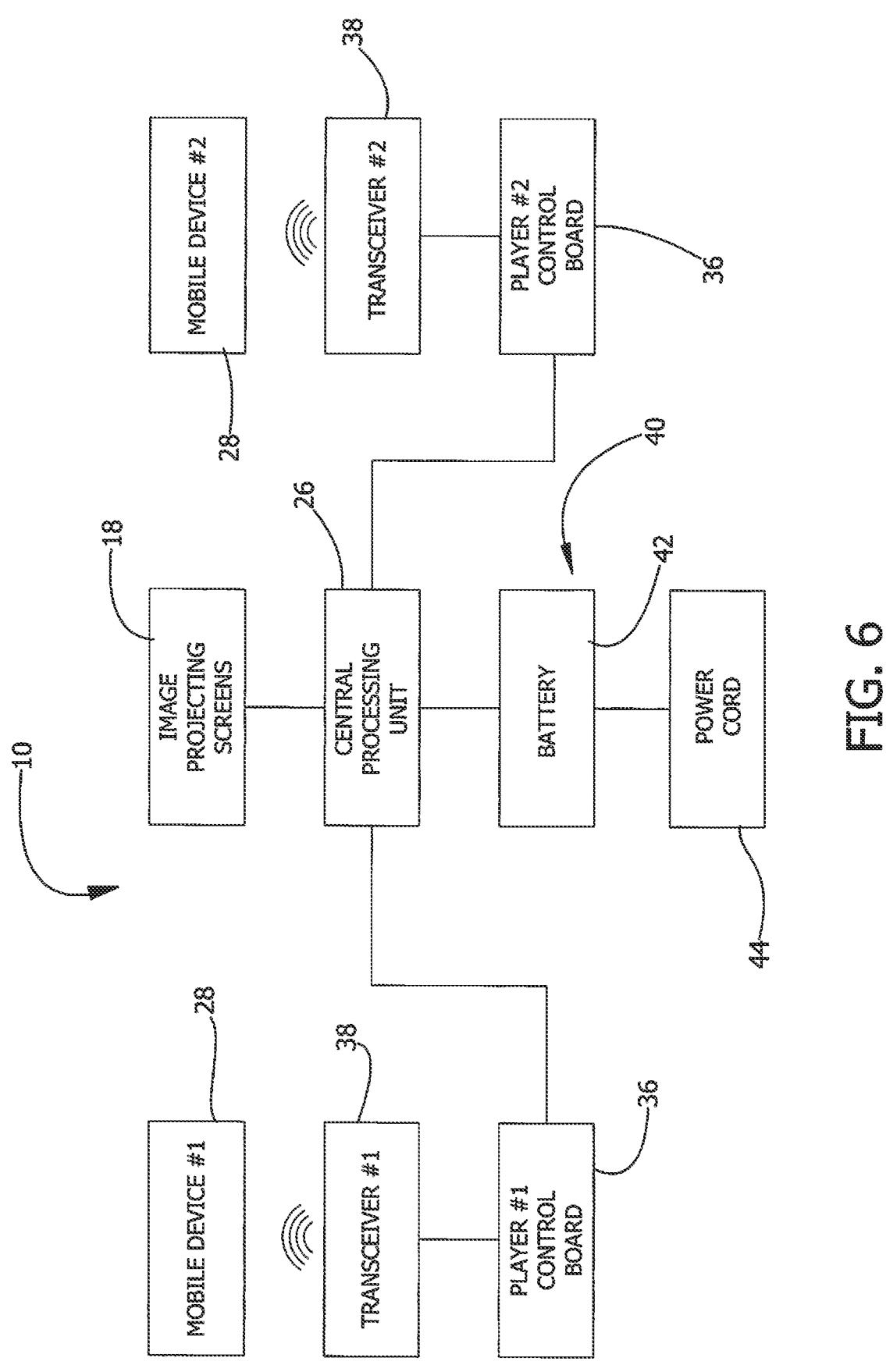

FIG. 6 is a block diagram of an embodiment of the disclosure.

DETAILED DESCRIPTION OF THE INVENTION

With reference now to the drawings, and in particular to FIGS. 1 through 6 thereof, a new holographic display embodying the principles and concepts of an embodiment of the disclosure and generally designated by the reference numeral 10 will be described.

As best illustrated in FIGS. 1 through 6, the three-dimensional display system 10 generally comprises a base 12 and a holographic display 14 mounted on the base 12. The holographic display 14 is configured for displaying holographic images which are viewable from a peripheral space 16 surrounding the holographic display 14. The holographic display 14 is also configured for displaying holographic images which at least appear to occupy a space adjacent to one player 48 of a pair of players 48 when viewed by another player 48 of the pair of players 48 positioned across the holographic display 14 from the one player 48. For the purposes of this disclosure, the term "holographic display" includes displays which cause a virtual object to occupy a three-dimensional space and displays which cause a virtual image to be projected to a viewer such that it appears that the virtual image occupies a three-dimensional space. These displays include displays which are not considered by some to be true holographic displays, such as volumetric displays which illuminate physical points within a three-dimensional display medium or displays which rely on an illusion known as Pepper's ghost, in which images reflected off of a transparent screen appear to be positioned behind the transparent screen.

The Figures depict a holographic display 14 of the type which relies on the Pepper's ghost illusion. The holographic display 14 comprises an image projector 18 and a display screen 20. The display screen 20 defines an interior volume 22 therein, and the image projector 18 is oriented to project images onto an exterior surface 24 of the display screen 20 viewable from the peripheral space 16. The display screen 20 is transparent such that images projected onto the exterior surface 24 of the display screen 20 from the image projector 18 appear as objects in the interior volume 22 of the display screen 20. The display screen 20 has a pyramidal shape but may have other shapes suitable to define the interior space and reflect the projected images to the players 48. The display screen 20 may, for example, have a pyramidal frustum shape. When the players 48 are positioned adjacent to the display screen 20, the holographic images may be projected to appear to occupy a space near a perimeter of the display screen 20 adjacent to one of the players 48. The Figures depict the image projector 18 above the display screen 20, but the image projector 18 may also be positioned below the display screen 20. The display screen 20 is typically taller than the players 48 to better simulate the players 48 being part of a virtual environment generated by the holographic projector. However, in some embodiments, the display screen 20 may be shorter than the players 48.

A processor 26 is operatively coupled to the holographic display 14, and a pair of remote electronic devices 28 is communicatively coupled to the processor 26. The remote electronic devices 28 may be smartphones, tablets, laptop computers, desktop computers or the like. The remote electronic devices 28 may communicate wirelessly or via a wired connection with the processor 26. Each remote electronic device 28 of the pair of electronic devices has a memory which stores player 48 game data. The player 48 game data may be unique to the remote electronic device 28 on which it is stored and may correspond to an associated player 48 of the pair of players 48. The processor 26 is operable to cause the holographic display 14 to display virtual game characters 46 corresponding to the player 48 game data of each remote electronic device 28 and to cause the holographic display 14 to display the virtual game characters 46 interacting with each other in response to input data. Such interactions may include, for example, combative actions. The virtual game characters 46 may have a variety of appearances. For example, the virtual game characters 46 may appear as Pokémon monsters, animals, humans, robots, or the like.

A pair of player stations 30 is mounted to the base 12, and the player stations 30 are positioned opposite each other across the holographic display 14. Each player station 30 of the pair of player stations 30 comprises a barrier 32, a user interface 36, and a transceiver 38. The barrier 32 defines a player area 34 opposite the holographic display 14 across the barrier 32. The barrier 32 has a U-shape but may have any suitable shape for defining the player area 34. Indicia may also be used to indicate the location of the player area 34. The user interface 36 is communicatively coupled to the processor 26 and is operable to send instructions to the processor 26. The transceiver 38 is communicatively coupled to the user interface 36 and an associated remote electronic device 28 of the pair of remote electronic devices 28. The transceiver 38 communicatively couples the associated remote electronic device 28 to the processor 26. In some embodiments, the remote electronic devices 28 may be used to input instructions to the processor 26, and a single transceiver may be provided which couples the pair of remote electronic devices 28 to the processor 26. A power supply 40 is electrically coupled to the processor 26 and comprises a battery 42. A power cord 44 is electrically coupled to the battery 42 and is configured to electrically couple to an external power source to charge the battery 42. In other embodiments, the processor 26 may be directly couplable to the external power source.

In use, the players 48 are positioned in respective player areas 34 and opposite each other across the holographic display 14. The processor 26 obtains the player 48 game data from each remote electronic device 28 and causes the holographic display 14 to display the virtual game characters 46 corresponding to the player 48 game data. This may be selectively performed by input from one or both players 48 via a respective user interface 36 or remote electronic device 28. Further input may be given by one or both players 48 to cause at least one of the virtual game characters 46 to perform an action, which may include interacting with the other virtual game character 46. The processor 26 may also follow further instructions stored on a processor 26 memory or the memory of one of the remote electronic devices 28 corresponding to operation of a game involving the virtual game character 46s. For example, in a fighting game, damage may be exerted by one virtual game character 46 on the other, and the damage may be presented by the holographic display 14 by altering the visual appearance of at least one of the virtual game characters 46 or showing a representation of the damage in graphical, numerical, or like form.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A three-dimensional display system for playing a game, the system comprising:

a holographic display configured for displaying holographic images which are viewable from a peripheral space surrounding the holographic display;

a processor being operatively coupled to the holographic display;

a pair of remote electronic devices communicatively coupled to the processor, each remote electronic device of the pair of electronic devices having a memory, the memory storing player game data;

wherein the processor is operable to cause the holographic display to display virtual game characters corresponding to the player game data of each remote electronic device, the processor being operable to cause the holographic display to display the virtual game characters interacting with each other in response to input data; and a pair of player stations positioned opposite each other across the holographic display, each player station of the pair of player stations comprising a barrier defining a player area opposite the holographic display across the barrier, each barrier having U-shape wherein each barrier is configured for extending laterally in front of and around opposed sides of a user standing in the player area; and each player station having a respective floor coupled to and extending from the barrier, each floor extending outwardly beyond opposed ends of the barrier such that each floor is configured to be stood upon by the user.

2. The system of claim 1, wherein the holographic display is configured for displaying holographic images which at least appear to occupy a space adjacent to one player of a pair of players when viewed by another player of the pair of players positioned across the holographic display from one player.

3. The system of claim 1, wherein the holographic display comprises an image projector and a display screen, the display screen defining an interior volume therein, the image projector being oriented to project images onto an exterior surface of the display screen viewable from the peripheral space, the display screen being transparent such that images projected onto the exterior surface of the display screen from the image projector appear as objects in the interior volume of the display screen.

4. The system of claim 3, wherein the display screen has a pyramidal shape.

5. The system of claim 1, wherein each player station of the pair of player stations further comprises a user interface communicatively coupled to the processor, the user interface being operable to send instructions to the processor.

6. The system of claim 5, wherein each player station of the pair of player stations further comprises a transceiver communicatively coupled to the user interface and an associated remote electronic device of the pair of remote electronic devices, the transceiver communicatively coupling the associated remote electronic device to the processor.

7. The system of claim 1, further comprising a base, the holographic display being mounted on the base, the pair of player stations being mounted to the base.

8. The system of claim 1, further comprising a power supply electrically coupled to the processor, the power supply comprising a battery.

9. The system of claim 8, further comprising a power cord being electrically coupled to the battery, the power cord being configured to electrically couple to an external power source to charge the battery.

10. A three-dimensional display system for playing a game, the system comprising:

a base;

a holographic display mounted on the base, the holographic display configured for displaying holographic images which are viewable from a peripheral space surrounding the holographic display, the holographic display being configured for displaying holographic images which at least appear to occupy a space adjacent to one player of a pair of players when viewed by another player of the pair of players positioned across the holographic display from the one player, the holographic display comprising an image projector and a display screen, the display screen defining an interior volume therein, the image projector being oriented to project images onto an exterior surface of the display screen viewable from the peripheral space, the display screen being transparent such that images projected onto the exterior surface of the display screen from the image projector appear as objects in the interior volume of the display screen, the display screen having a pyramidal shape;

a processor being operatively coupled to the holographic display;

a pair of remote electronic devices communicatively coupled to the processor, each remote electronic device of the pair of electronic devices having a memory, the memory storing player game data;

wherein the processor is operable to cause the holographic display to display virtual game characters corresponding to the player game data of each remote electronic device, the processor being operable to cause the holographic display to display the virtual game characters interacting with each other in response to input data;

a pair of player stations mounted to the base and positioned opposite each other across the holographic display, each player station of the pair of player stations comprising:

a barrier defining a player area opposite the holographic display across the barrier, each barrier having U-shape wherein each barrier is configured for extending laterally in front of and around opposed sides of a user standing in the player area;

a floor coupled to and extending from the barrier, the floor extending outwardly beyond opposed ends of the barrier such that the floor is configured to be stood upon by the user;

a user interface communicatively coupled to the processor, the user interface being operable to send instructions to the processor; and a transceiver communicatively coupled to the user interface and an associated remote electronic device of the pair of remote electronic devices, the transceiver communicatively coupling the associated remote electronic device to the processor;

a power supply electrically coupled to the processor, the power supply comprising a battery; and a power cord being electrically coupled to the battery, the power cord being configured to electrically couple to an external power source to charge the battery.

* * * * *